Feb. 12, 1963 E. ZIEGLER 3,077,218
DISH-SPRING LOCK-WASHERS
Filed Sept. 2, 1958 2 Sheets-Sheet 1
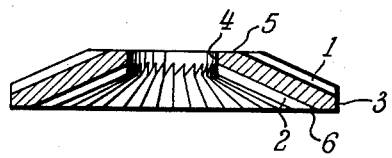
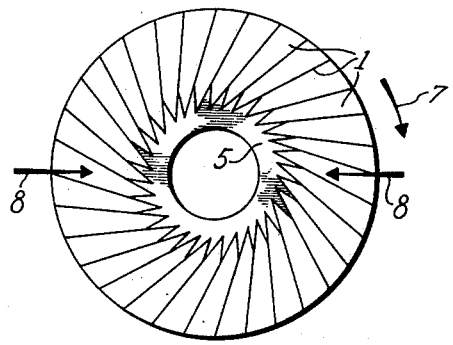
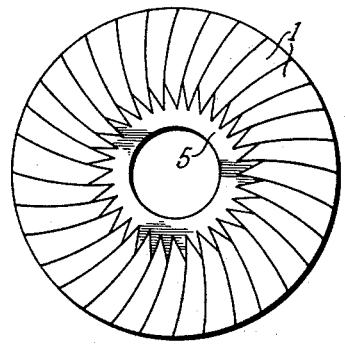
INVENTOR
ERNST ZIEGLER
BY
ATTORNEY Feb. 12, 1963 E. ZIEGLER 3,077,218
DISH-SPRING LOCK-WASHERS
Filed Sept. 2, 1958 2 Sheets-Sheet 2

INVENTOR.
ERNST ZIEGLER 3,077,218
DISH-SPRING LOCK-WASHERS
Ernst Ziegler, Stuttgart-Vaihingen, Germany, assignor to Adolf Schnorr KG, Maichingen, Germany, a firm
Filed Sept. 2, 1958, Ser. No. 758,208
4 Claims. (Cl. 151—35)

The present invention relates to lockwashers, and more particularly to lockwashers having the shape of a concave-convex dish-spring with teeth running radially between the inner and the outer edges of the dish.

The primary object of the invention is to provide a lockwasher which will anchor, and keep anchored, its teeth in the adjacent faces under the most adverse thermal expansion and vibration, by utilizing the elasticity inherent to a dish-spring.

The extraodinarily strong spring force of a dish-spring is capable of equalizing every expansion of a bolt.

Another object of the invention is to provide an improved lockwasher, capable of obsorbing an increased pressure without breaking. The lockwashers of the prior art are of the split-ring helical type with projections, for instance, which, upon application of extensive pressure, are pressed radially outward in the direction in which the materials become engaged. Since this is not a closed ring, it gives in without resistance to the material forces as they effect themselves in the radial direction. The split-ring becomes bent in its cross-sectional plane and is pressed out under the nut. Other conventional lockwashers with radially running teeth of the closed type have their cross-sections entirely in one plane, contrary to the frusto-conical shell-shape of the lockwasher of the present invention. Because of their closed shape they are capable of absorbing substantially greater pressures than the split lockwashers. Such closed lockwashers do not have a spring action, and therefore are not capable of compensating for an expansion of a threaded bolt due to heating or to its movements caused by vibration.

It is an object of the present invention to eliminate safely the above-mentioned shortcomings by giving the lockwasher the shapes hereinafter described. The arcuated cross-section of the dish-spring of the present invention safeguards the ring against deformation even at highest compressions and against being pressed out, and the great spring-force of the dish-spring prevents the loosening of the nut even under heavy vibration or expansion of the bolt. Instead of a frusto-conical cross-section, it is possible to give the dish-spring a cross-section of an arch-like surface. The biting effect of the teeth may thus be arranged differently in the surfaces involved. This may prove to be particularly advantageous, when the two opposing surfaces engaging the lockwasher are each of a different hardness, such as, for instance, when the lockwasher engages a nut made of steel with one side and a work-piece made of light metal with the other side. The teeth may have any suitable cross-section, in particular, however, a saw-tooth cross-section with a steep leading edge and a flat trailing edge. The steep leading edge faces the direction of rotation in which the nut is loosened. When the nut is tightened, the engaged surface slides over the flat trailing edge of the tooth.

In a particularly preferred embodiment of the invention, the lockwasher comprises a tooth-free shoulder along the edges facing the surfaces to be engaged. Thus, the teeth on the outer surface of the dish-spring begin at a distance from the edge of the central orifice, and the teeth on the inner side of the cone-shell end at a distance short of the outer edge of the lockwasher. This embodiment of the invention has a particular advantage in that during tightening of the nut against the base-disc, the surfaces engaging the lockwasher at first slide over the toothless smooth shoulders, until the spring-dish becomes tightened to an extent, at which it is nearly flattened. Only then do the teeth of the base-disc engage the contacted surfaces and effect the locking. When the surface of the part to be locked is painted, chromed, or otherwise coated, then this advantage of the lockwasher gains in importance. In such a case it is important that the teeth engage the adjoining surface only during the final relatively small angle of turn of the nut so that the upper surface becomes scraped only over the least possible area of angular reach.

Another object of the invention is to provide lockwashers of the type described having teeth running obliquely relative to the radial lines of teh frusto-conical shell.

Another object of the invention is to provide a lockwasher of the type described having teeth running relative to the frusto-conical shell surface in curved lines. Experiments have proven that the lockwasher of the present invention, provided with teeth running obliquely to the radial lines, creates an improved locking over lockwashers having teeth running radially.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a central cross-sectional view of a lockwasher of the present invention, having the shape of a frusto-conical shell, with teeth running radially.

FIGURE 2 is a plan view of another embodiment of the lockwasher of the present invention, forming a frusto-conical shell with teeth running obliquely to the radial lines.

FIGURE 3 is a plan view of still another embodiment of the present invention showing the teeth of the lockwasher curved and running in an axis also oblique to the radial lines of the frusto-conical shell.

In the drawings like reference characters designate like or corresponding parts throughout the several views.

Figure 4:
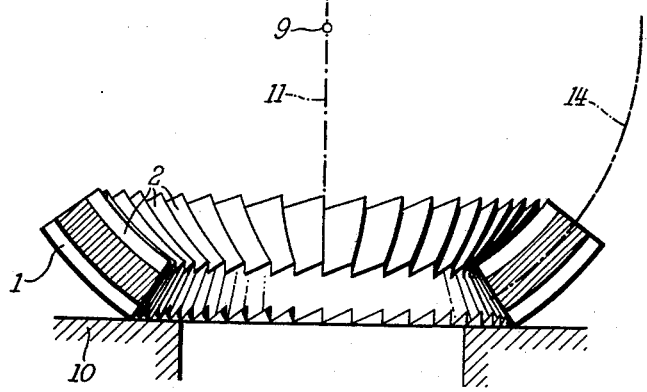
FIGURE 4 is a perspective view of a section of an embodiment of a lockwasher of the present invention having a shell representing the curved surface of a sphere or of a spheroid.

In FIGURE 1 an embodiment of the lockwasher of the present invention is shown having the shape of a frusto-conical shell. On the outer and the inner surfaces of the shell of a dish-spring, teeth denoted as 1 and 2 respectively, are provided. The teeth of the outer surface of the dish-spring run from the outer edge 3 inwards. They end, however, at a distance from the inner edge 4. A flat ring-like shoulder 5 with a central orifice for the bolt is provided at the top of the frustum, and its outer edge terminates the outer teeth 1 of the lockwasher. The teeth 2 run on the inner surface of the shell from the iinner edge 4 outwards, where a similar flat shoulder 6 is provided. While the shoulders 5 and 6 are shown and described as flat, it would fall within the scope of the invention to provide these shoulders, or either of them, with a curved surface instead.

While the shoulders 5 and 6 may be omitted without affecting the operability of the invention, they are an additional improvement.

In FIGURE 2 an embodiment of the lockwasher of this invention is shown, substantially of the same truncated cone shape as that of FIGURE 1 and made from the same dish-spring resilient hard material. Here, however, the teeth are shown running obliquely to the radial lines of the frustum shell. The direction of the slant is indicated in FIGURE 2 by arrow 7 and is meant to be in this direction for clockwise tightening of the nut, looking downwards. During tightening the portion of the lockwasher engaged by the nut is compressed so that the material surrounding the central orifice tends to move outward. When the lockwasher then is tightened, the radial force of pressure of the material being compressed is indicated by arrows 8—8 as directed radially inward. Thus, as can be comprehended from FIGURE 2, these forces exercises a torque upon the oblique teeth in the direction of arrow 7, which opposes the loosening of the nut.

Experiments confirmed that the oblique teeth arrangement actually effected a greater resistance to the loosening of a nut than could be achieved with teeth running radially.

In FIGURE 3 a lockwasher is shown having the shape of the shell of a frustum and intended to be of dish-spring resilient material the same as that of the preceding figures, wherein the outer or the inner teeth, or both, are curved, not only because they are following the curved shell of the truncated cone as the teeth shown in FIGURE 2 necessarily do, but also curved on the shell toward the outer edges 3. The shoulders 5 and 6 again are optional.

In FIGURE 4 another embodiment of the lockwasher of the present invention is demonstrated, wherein the lockwasher has a curved surface of the shape of the shell of a segment of a sphere, a spheroid, or similar body having curved surfaces. The embodiment of the lockwasher actually shown in FIG. 4 represent a segment of a sphere 14, having an imaginary center 9 in the axis 11 of the bolt, not shown. 10 represents the surface adjoining the lockwasher against which the latter in tightened by a nut, the nut also being omitted from the drawing for reasons of greater clarity of illustration. In FIG. 4 the lockwasher is shown with the shoulders 5 and 6 omitted. The same shoulders as shown in FIGURES 1 and 2 may, of course, be incorporated into the embodiment of FIGURE 4.

Figure 5:
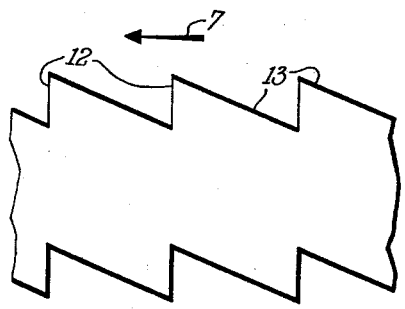
FIGURE 5 shows a cross-sectional detail of a greatly enlarged scale of a preferred embodiment of a tooth of lockwashers, such as shown in the several embodiments of FIGURES 1 to 4 inclusive.

In FIGURE 5 a preferred tooth structure, which may be used advantageously with all embodiments of the invention, is shown in an enlarged cross-sectional view. The teeth have a steep leading edge 12, shown running substantially at right angles to the cross-sectional plane of the lockwasher, and a trailing edge 13 slanting relative to the leading edge of the tooth in the direction opposite to the nut-tightening rotation of the latter, as indicated by arrow 7.

While the toothless shoulders 5 and 6, as shown and described with reference to FIG. 1, are advantageous also with the embodiments of the invention shown in FIGS. 2, 3 and 4, they may be constructed with the teeth also running through them. Alternatively, the flat shoulders 5 and 6 may be omitted entirely in either of the embodiments of FIGS. 1 to 4 inclusive and the teeth may continue to run from the outer to the inner edges.

While the several embodiments of the lockwasher of the present invention are operable in conjunction with any conventional tooth structure, the tooth structure shown in FIGURE 5 and described in conjunction therewith is applicable to every embodiment, and an additional novel and useful effect is produced by the combination thereof with any of the curved structures of the lockwasher of the present invention.

While the invention has been described with teeth running both on the outer and the inner surfaces of the shell, a novel and useful effect is produced if the teeth are incorporated on one side of the lockwasher only. It is understood that the term dish-spring includes the definition of a resilient, non-brittle spring material conventional to the art, such as steel or steel alloys. At least the biting edges of the teeth are to be made of hardened material, such as steel or steel alloys, capable of engaging the corresponding adjoining surface to fulfill its function.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

In these claims, the term "continuous" as used in connection with the surfaces of the washer, means that these surfaces are unbroken by slots such as those provided in split washers. The terms "upper," "lower," etc. are with reference to the invention as viewed upon the drawing and are not to be construed as limiting the invention to any particular position of use.

I claim:

1. A lock-washer comprising a continuous substantially conically shaped wall having an uninterrupted circular inner edge defining a central hole and an uninterrupted circular peripheral outer edge, the opposed surfaces of said wall each having a multiple number of linear teeth distributed about the circumference of the wall and extending in the direction between said inner and outer edges, the outer surface of said substantially conically shaped wall being flattened in the form of a planar shoulder immediately adjacent said inner edge defining said central hole, said flattened shoulder extending in a plane substantially normal to the axis of said hole, and teeth on said outer surface terminating at said flattened shoulder and the ends thereof lying in the plane of said shoulder, the inner surface of said substantially conically shaped wall having a second flattened shoulder substantially parallel to said first-mentioned flattened shoulder immediately adjacent said outer edge, the teeth on said inner surface terminating adjacent said second flattened shoulder and the ends thereof lying in the plane of said second shoulder.

2. Lock-washer according to claim 1 in which said wall has a central axis of symmetry, said opposed surfaces are substantially parallel to each other and in which said linear teeth are defined by substantially radially extending serrations closely distributed adjacent one another.

3. Lock-washer according to claim 2 in which each of said teeth has a surface extending substantially normal to the plane of said wall.

4. A lock-washer comprising a continuous curved wall having an uninterrupted circular inner edge defining a central hole and an uninterrupted circular peripheral outer edge, one surface of said wall being substantially convex shaped and the opposed surface substantially concave shaped, each of said surfaces having a multiple number of linear teeth distributed about the circumference of the wall and extending in the direction between said inner and outer edges, the convex surface of said wall being flattened in the form of a planar shoulder immediately adjacent said inner edge defining said central hole, said flattened shoulder extending in a plane substantially normal to the axis of said hole, the teeth on said convex surface terminating at said flattened shoulder and the ends thereof lying in the plane of said shoulder, the concave surface of said wall having a second flattened shoulder substantially parallel to said first-mentioned flattened shoulder immediately adjacent said outer edge, the teeth of said convex surface terminating adjacent said second flattened shoulder and the ends thereof lying in the plane of said second shoulder.

References Cited in the file of this patent

UNITED STATES PATENTS

| | | |
|---|---|---|
| 302,441 | Stevens | July 22, 1884 |
| 464,301 | Harvey | Dec. 1, 1891 |

(Other references on following page)

UNITED STATES PATENTS

| | | |
|---|---|---|
| 813,714 | Ketcham | Feb. 27, 1906 |
| 1,607,079 | Hobbs | Nov. 16, 1926 |
| 1,793,542 | Cabbage | Feb. 24, 1931 |
| 1,911,384 | Olson | May 30, 1933 |
| 1,923,647 | Vera | Aug. 22, 1933 |
| 1,945,005 | Vacher | Jan. 30, 1934 |
| 2,271,732 | Chappuis | Feb. 3, 1942 |
| 2,278,062 | Koharovich | Mar. 31, 1942 |

FOREIGN PATENTS

| | | |
|---|---|---|
| 721,806 | France | Dec. 23, 1931 |
| 619,160 | Germany | Sept. 5, 1935 |
| 888,486 | Germany | Sept. 3, 1931 |